UNITED STATES PATENT OFFICE.

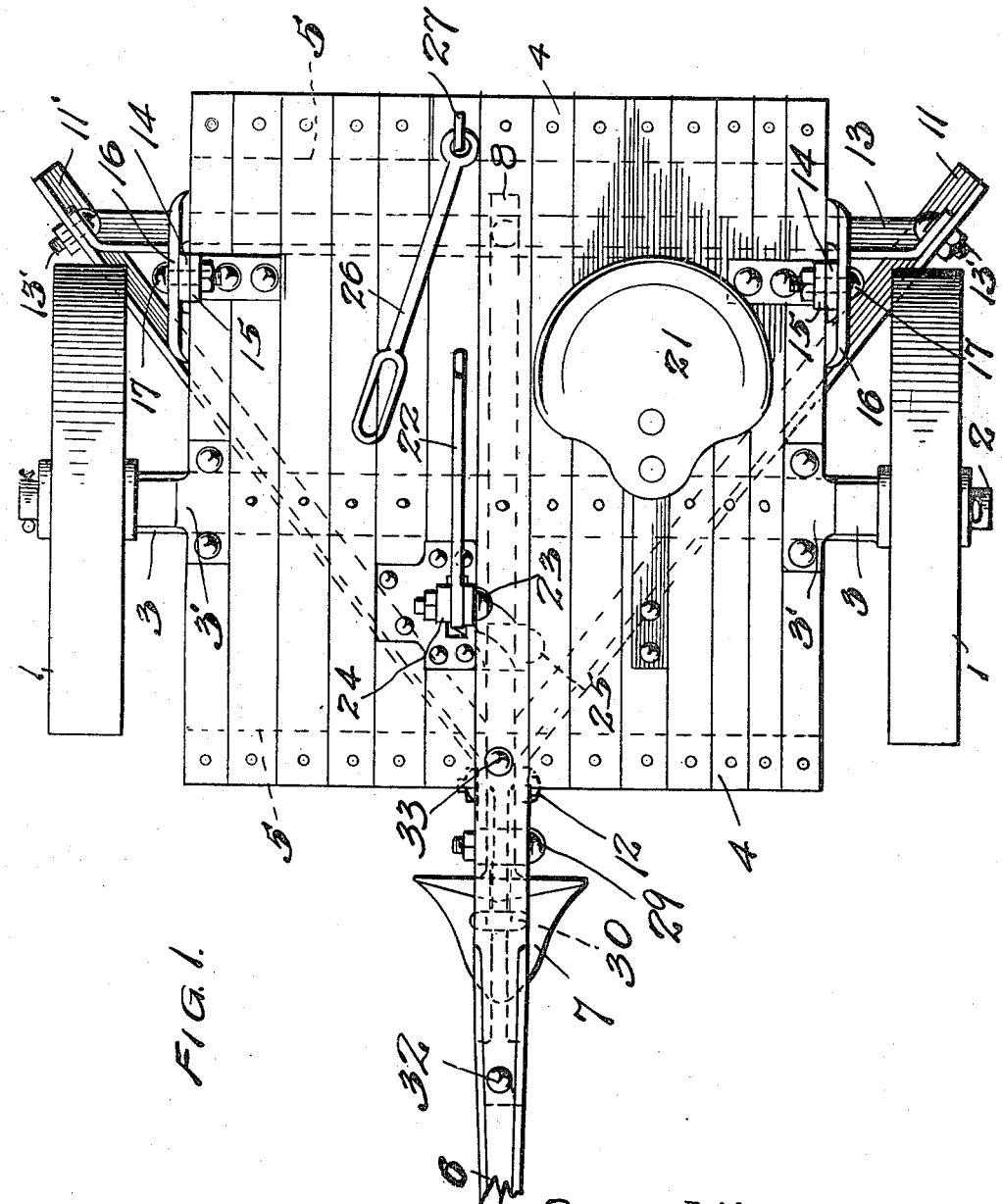

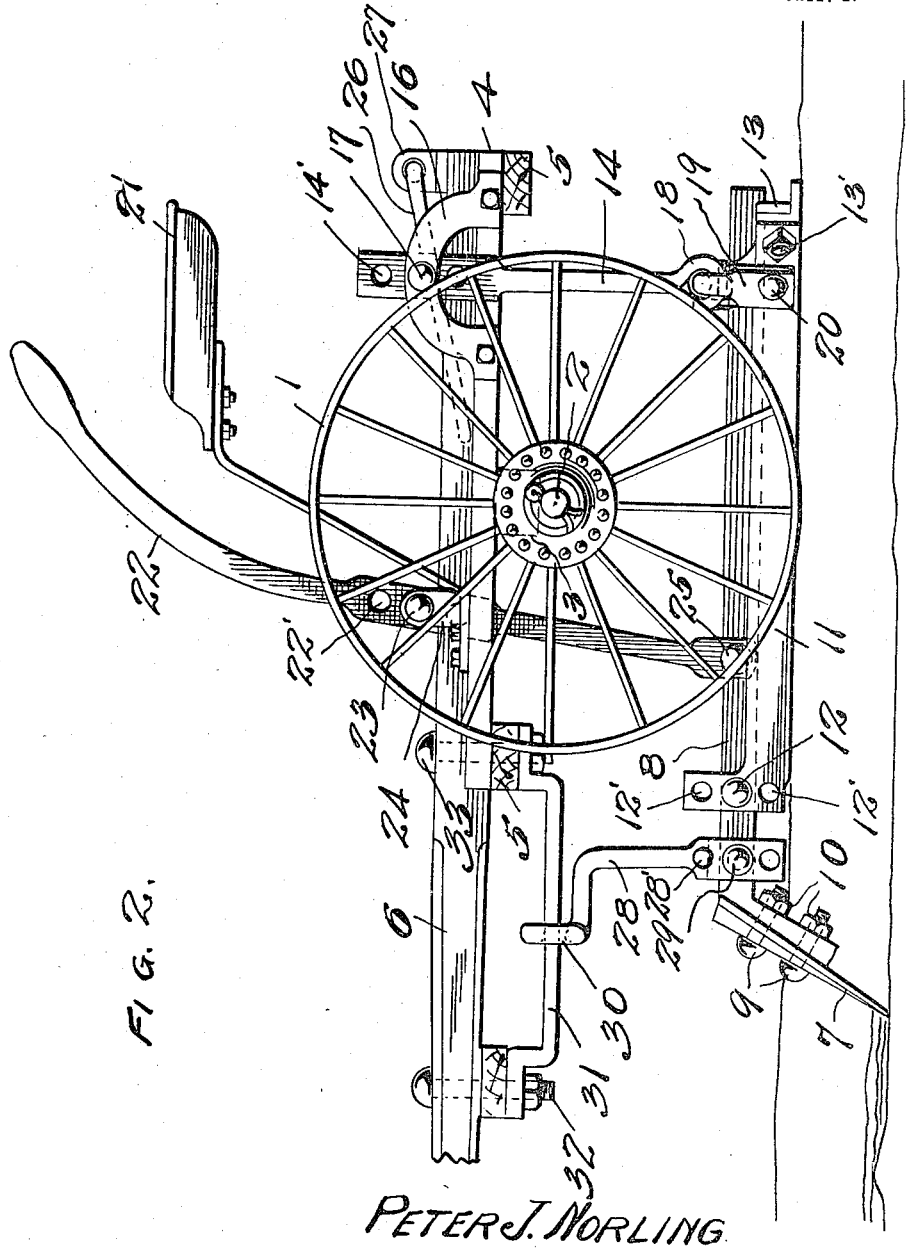

PETER JOHN NORLING, OF ELLENSBURG, WASHINGTON.

DITCHING-MACHINE.

1,205,251.   Specification of Letters Patent.   Patented Nov. 21, 1916.

Application filed July 24, 1916. Serial No. 110,983.

*To all whom it may concern:*

Be it known that I, PETER JOHN NORLING, a citizen of the United States of America, residing at Ellensburg, in the county of Kittitas and State of Washington, have invented new and useful Improvements in Ditching-Machines, of which the following is a specification.

My invention relates to improvements in ditching machines, adapted especially for use in digging irrigation ditches or drains, and for grading the material excavated from the ditch.

By the utilization of my device or implement I am enabled to excavate or dig the ditch and simultaneously grade the material taken from the ditch, and in this manner the operation is completed by using a plow to excavate the material and utilizing a spreader or grader in conjunction with the plow to spread and grade or level the material taken from the ditch.

The invention consists in certain novel combinations and arrangements of parts as will be hereinafter more fully described, claimed, and as illustrated in the accompanying drawings wherein I have shown one complete embodiment of my invention constructed according to the best mode I have so far devised for the application of the principles of my invention.

Figure 1 is a top plan view of an implement embodying my invention. Fig. 2 is a side elevation of the implement of the invention.

In the preferred embodiment of my invention as illustrated in the drawings I have exemplified a two-wheel implement or vehicle, the wheels being designated by the numerals 1, 1, and journaled on the axle 2 which is supported by the usual bed 3, the bearings 3' being supported on the platform or deck made up of the boards or timbers 4, 4. The platform boards extend longitudinally of the implement and are provided with transverse brace bars 5 5, to provide a rigid construction in connection with the tongue 6 of the implement.

The vehicle thus described is designed as a carriage for the plow 7 which is carried beneath the vehicle and toward the front its beam 8 extending rearwardly under the platform and the plow attached to the front bent end of the beam by bolts 9 and nuts 10. The plow may be of any desired shape, but I have illustrated the blade as triangular in shape and adapted to dig up the soil and pass it to both sides thereof so that the soil which is dug is turned to the right and left as the plowing progresses and thrown upon the ground along the edges of the excavated ditch.

To take care of the soil as it is excavated I provide a grading device or spreader, comprising a pair of arms 11 11' which are secured at 12 to the plow beam 8. At the rear, the diverging arms are connected by a transverse metal bar 13 which is secured to the diverging arms by bolts 13'. These arms and the cross piece are preferably of angle iron, and it will be seen that they form a triangular shaped frame adapted to slide over the ground on the two diverging arms, and these arms it will readily be seen spread the soil as it is dug or excavated by the plow 7. The spreader is rigid with the beam, but if it is desired, the bolt 12 may be placed in either of the holes 12' in the spreader frame, to adjust the spreader arms with relation to the plow beam. The formation of the diverging arms of the spreader permits them to slide freely over the surface of the ground, and support the plow beam, and its plow, as the latter digs into the ground and deepens the trench or ditch.

The beam of the plow and the spreader are suspended from the vehicle and supported thereby. At the rear of the implement a pair of vertically disposed links 14 14, are suspended, one at each side, from the brackets 15, and 16, a bolt 17 being provided as a pivot bolt passing through a perforation 14' in the link and also through the two brackets 15 and 16. At the lower end of each link an eye 18 is formed which loosely engages the hook 19 which is fastened by a rivet or bolt 20 to one of the arms 11, 11' of the spreader, and forms a loose connection as shown.

The implement is preferably horse drawn, being attached to the tongue 6, and the driver occupies the seat 21 and may manipulate the plow and spreader by means of the lever 22. The lever is pivoted at 23 in ears or lugs 24 secured on the platform 4, and the lever passes through an opening in the platform and is pivoted at 25 to the plow beam 8. The lever forms a third support in conjunction with the two suspending links 14, for the plow, beam and spreader, and these members may be lifted to inoperative position, as when transporting the implement, by swinging the lever on its pivot 23. The lever, when it is turned back may be held in position by means of a link or slotted bar 26 pivoted to an eye 27 fixed on the platform.

The lever 22 is provided with a series of pivot openings 22' so that it may be adjusted when the altitude of the plow and spreader is to be adjusted.

Forward of the lever 22 and just to the rear of the plow, a guide link 28 is arranged, and pivoted on the beam at 29, a series of openings 28' being provided in the link to permit of adjustment of the plow and spreader. The upper end of this link is formed with an eye 30 which loosely encompasses a longitudinally arranged guide bar 31 located beneath the tongue 6 and attached thereto by means of the bolts 32 33. This guide link and bar form an additional support for the operating parts, at the front of the implement, and at the same time assist in holding the plow against strains as it passes through the soil.

From the above description it will be plain that the plow, its beam and the spreader are supported from the implement, and may be held in operative position by the driver, who grasps the lever in his right hand while he drives the horse with his left. The plow and spreader, however, are held against lateral swing or motion by their suspending members. In this arrangement of parts, the soil is excavated by the plow, turned to right and left as the plow moves forward, and then the diverging arms spread the soil on the surface of the ground at each side of and adjacent the ditch or trench. If it is necessary to pass over the same ditch a second time, the plow and spreader are adjusted so that the plow will cut at a greater depth, until the required depth of the ditch is reached. When making turns, the plow may be elevated by turning back the upper end of the lever 22 as before described, so that it will swing on its pivot and lift the operative parts free of and above the ground.

What I claim is:—

In a ditching machine, the combination with its platform and wheels, of a plow beam and plow, and a pair of rearwardly extending diverging grading arms adjustably attached at the front of the beam, a pivoted link adjustably suspended at each side of the platform and pivotal connection between said links and the arms, a guide bar parallel with the beam and fixed on the forward part of the platform, a guide link pivoted on the beam and formed with an eye movable on the guide bar, and an elevating lever pivoted on the platform and to the plow beam.

In testimony whereof I affix my signature.

PETER JOHN NORLING.